(No Model.)
C. ROHNE & J. MOENKE.
DUMPING CAR.
No. 277,350.
2 Sheets—Sheet 1.
Patented May 8, 1883.
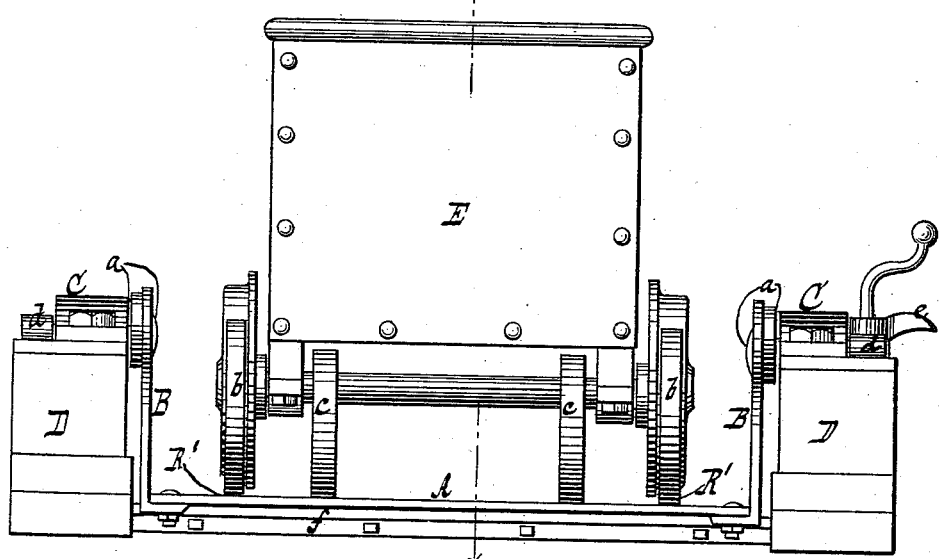
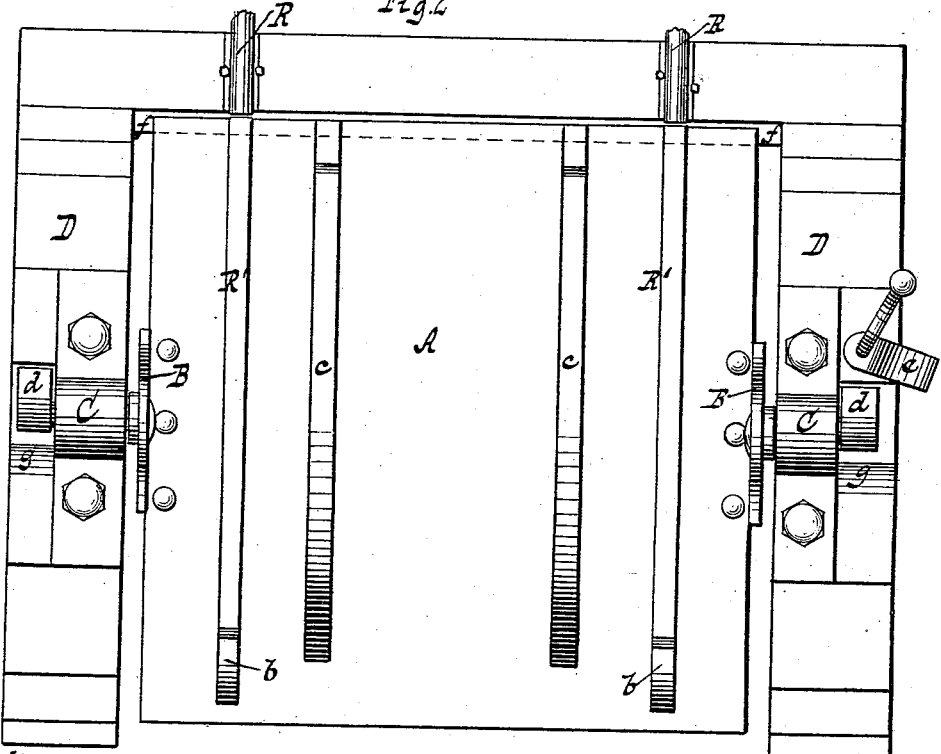
Witnesses.
Otto Hufeland
William Miller
Inventors
Charles Rohne
Johann Moenke
by Van Santvoord & Hauff their attys (No Model.) 2 Sheets—Sheet 2.

C. ROHNE & J. MOENKE.
DUMPING CAR.

No. 277,350. Patented May 8, 1883.

Witnesses.
Otto Hufeland
William Miller

Inventors
Charles Rohne
Johann Moenke
by Van Santvoord & Hauff
their att'ys

UNITED STATES PATENT OFFICE.

CHARLES ROHNE AND JOHANN MOENKE, OF HOBOKEN, NEW JERSEY.

DUMPING-CAR.

SPECIFICATION forming part of Letters Patent No. 277,350, dated May 8, 1883.

Application filed March 15, 1883. (No model.)

*To all whom it may concern:*

Be it known that we, CHARLES ROHNE and JOHANN MOENKE, citizens of Germany, both residing at Hoboken, in the county of Hudson and State of New Jersey, have invented new and useful Improvements in Dumping-Cars (or Wagons) and Platforms, of which the following is a specification.

This invention relates to dumping-cars, and has for its objects to provide a platform with novel devices for passing between the axles of the car or vehicle and the body thereof when the car or vehicle is propelled upon the platform, whereby the latter can turn completely upside down to dump the load, and yet retain the car or vehicle on the platform; and to provide novel means for retaining the platform in its normal position to receive the car or vehicle.

The objects of our invention we accomplish by the means hereinafter described, and specifically set forth in the claims and illustrated in the accompanying drawings, in which—

Figure 3:
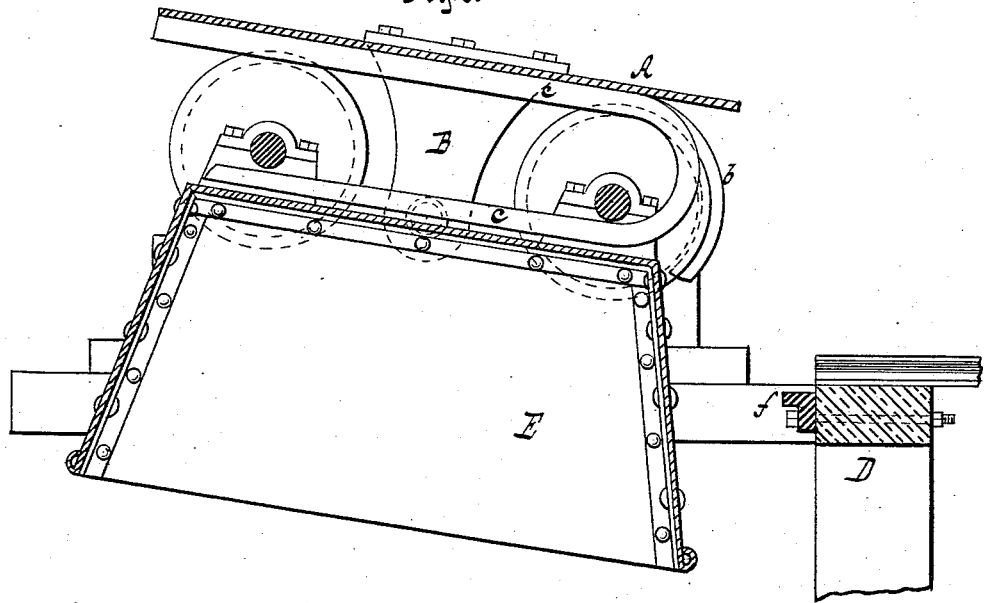
Figure 4:
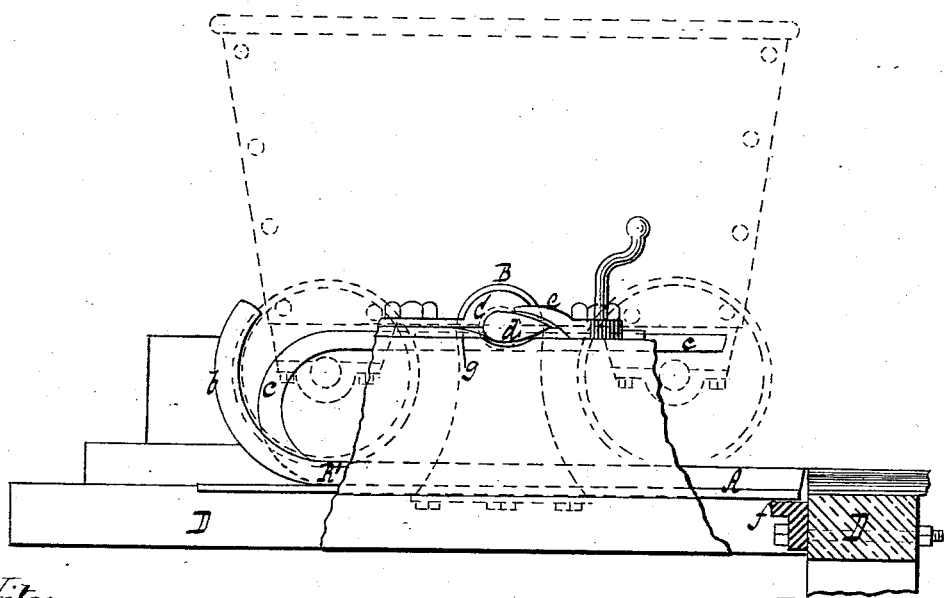

Figure 1 represents an end view of the platform with a railroad-car resting thereon. Fig. 2 is a plan or top view of the platform. Fig. 3 is a vertical section in the plane $x\,x$, Fig. 1, showing the car and platform inverted. Fig. 4 is a side elevation, partly in section.

Similar letters indicate corresponding parts.

In the drawings, the letter A designates a platform, from the sides of which rise standards B B, and from each of these standards projects a fixed gudgeon, $a$. The gudgeons $a$ have their bearings in boxes C C, secured to the stationary frame-work D. This frame-work forms the support for the rails R R, Fig. 2, and it is constructed in such a manner that the cars, wagons, or vessels intended to receive the coal or other material to be dumped can be driven or moved beneath the platform A.

The cars E, which contain the coal or other material to be dumped, are pushed, one after the other, forward on the rails R R, and on the platform A are secured rails R' R', corresponding in position to the rails R R, so that each car, on reaching the platform A, strikes the rails R' R'. The ends of these rails are bent upward to form stops $b\,b$ to prevent the car from being pushed out beyond the required point. On the platform A are also secured suitable retaining devices for the car.

The retaining devices consist of long hooks $c\,c$, which are situated between the rails R' R', and which are so constructed that they catch over the axles of the car E when the same is pushed upon the platform A, and that they retain said car when the platform is tilted over to the position shown in Fig. 3.

On the outer end of each of the gudgeons $a\,a$ is a dog, $d$, and with one of these dogs is combined a latch, $e$, which, when brought into the position shown in Fig. 4, serves to lock the platform A in its normal position, the inner end of said platform, when it occupies this position, being supported by a ledge, $f$, on the frame-work D.

When a loaded car has been moved upon the platform, as shown in Fig. 1, the center of gravity of the load, combined with the car and the platform, is situated above the level of the gudgeons $a\,a$, and as soon as the latch $e$ is made to release the dog $d$ the platform turns over to the position shown in Fig. 3, being arrested in this position by the dogs $d\,d$ striking against shoulders $g$, formed on the frame-work, as shown in Figs. 2 and 4. The contents of the car are immediately dumped, and the position of the center of gravity of the car and platform combined is changed so as to be above the level of the gudgeons $a\,a$. In consequence of this change the platform swings back to its normal position, where it can be locked again by the latch $e$. The empty car is then pushed off from the platform, a switch being provided, (which is not shown,) so that said car can be moved on a side track, and a fresh loaded car is moved upon the platform, its contents are dumped as above described, and so the operation continues with the least possible amount of hand labor, and in a comparatively short time the contents of a large number of cars can be dumped.

It is obvious that our invention can be applied to ordinary carts or wagons, in which case the rails R R R' R' can be dispensed with.

We are aware that means for dumping cars have heretofore been known in which devices were used to confine the car on the rails when the platform was turned to dump the load, and therefore we do not broadly claim such features; but

What we claim as new, and desire to secure by Letters Patent, is—

1. The combination, with the pivoted platform, of the hooks c c, secured at one end to the platform, and having their other ends free and adapted to pass between the axles and the body of a car or other vehicle when propelled upon the platform, substantially as described.

2. The combination, with the pivoted platform provided with rails R' and stops b, of the hooks c c, secured at one end to the platform, between the rails, and their free ends elevated and adapted to catch over the axles of the vehicle when the latter passes onto the platform, substantially as described.

3. The combination, with the platform, of the gudgeons a a, forming the pivots therefor, the frame D, the dog d on the outer end of the gudgeon, and the latch e, pivoted to the frame, substantially as and for the purpose described.

4. The frame D, provided with the ledge f, in combination with the platform pivoted by gudgeons a a, the dog d, and pivoted latch e, substantially as described.

In testimony whereof we have hereunto set our hands in the presence of two subscribing witnesses.

CHARLES ROHNE.
JOHANN MOENKE.

Witnesses:
W. HAUFF,
E. F. KASTENHUBER.